INVENTORS
LEE C. McCANDLESS
JAMES C. WITHERS
CHARLES R. BRUMMETT

BY *Alexander & Dowell*

ATTORNEYS

INVENTORS
LEE C. McCANDLESS
JAMES C. WITHERS
CHARLES R. BRUMMETT

BY *Alexander & Dowell*

ATTORNEYS

United States Patent Office 3,549,413
Patented Dec. 22, 1970

3,549,413
REINFORCING FILAMENTS COMPRISING
COATED TUNGSTEN WIRES
Lee C. McCandless, Arlington, Va., James C. Withers,
Accokeek, Md., and Charles R. Brummett, Washington, D.C., assignors to General Technologies Corporation, a corporation of Delaware
Continuation of application Ser. No. 519,625, Jan. 10,
1966. This application July 28, 1969, Ser. No. 849,242
Int. Cl. C23c 11/08
U.S. Cl. 117—106
8 Claims

ABSTRACT OF THE DISCLOSURE

A high-strength low density filamentous reinforcement material adapted to be incorporated into composite structures as reinforcement, formed of a fine tungsten core wire having a coating thereon of boron silicide, silicon carbide, titanium nitride, titanium boride, or aluminum boride. The coated wire has a diameter at least four times the diameter of the core wire alone, with the coating constituting at least 93% of the cross-sectional area thereof, to give a low-density, high modulus of elasticity material.

---

This application is a continuation of application Ser. No. 519,625, filed Jan. 10, 1966, now abandoned.

This invention relates to the manufacture of high modulus of elasticity, low-density reinforcing filaments, and more particularly to apparatus, novel processes, and novel coatings formed by vapor deposition upon a fine substrate, such as a tungsten wire.

The invention described herein may be manufactured and used by or for the United States Government for governmental purposes without payment of royalty therefor.

This invention is designed to meet the need for new structural reinforcement materials which are very light in weight, but which are able to withstand corrosion, high temperatures, and great stresses. The invention relates to improved reinforcing means in the form of filaments which can be embedded in a bulk material to increase its strength. The resulting composite materials are distinguished by having especially high strength and high modulus of elasticity, but low density. Such reinforcing filaments can be interwoven to form a fabric, or can be laid in courses in a matrix material to form a composite having the desired characteristics. It has been known for some time that the filament form of a material is frequently many times stronger than its bulk form, and this fact leads to the combination of filamentary materials of high tensile strength and of high modulus of elasticity with light-weight bulk materials of lower strength and lower modulus of elasticity to produce high-strength composites of low density.

The process taught in this disclosure is a vapor deposition process for reducing or decomposing a volatile compound of the coating material upon a heated surface, such as is shown broadly in Barnes Pat. 3,123,497, and in Moers Pat. 1,987,576, the latter showing deposition upon a wire. The coating compound in this general type of process can be either a gas, a liquid, or a solid at ambient temperature, although in the latter case, in order to get a solid coating compound into a vapor state it must be sublimed or liquified, and then vaporized by passing a carrier gas through it. In any event, the vapor phase of the compound must occur at a temperature well below the melting points both of the coating and of the substrate material, and this compound when vaporized must be sufficiently stable to prevent its decomposition or reduction before it reaches the heated surface on which it is to be deposited.

The novel filaments made according to the present disclosure have a core of tungsten, or other wire, which is very small, for instance about 0.0005–0.001 inch in diameter. This wire is placed in, or passed through, a sealed deposition chamber, and the wire within the chamber is heated to the desired deposition temperature by passing electric current therethrough as in the above-mentioned Moers patent.

The substrate wire may also be heated by external radiation sources, or by induction or dielectric coupling to the metal substrate.

The chamber contains, for example, a mixture of dried and purified hydrogen and argon gases at least one of which is bubbled through nongaseous coating compounds so as to entrain a vapor thereof in the gas, which vapor is then carried into contact with and deposited upon the heated wire substrate as it moves through the chamber. This coating is built up many times thicker than the wire substrate, for example to a diameter of 0.0030–0.0040 inch, or more. In the practical system now being operated, the deposited coating amounts to at least 93%, by volume, of the finished filament, although less by weight. Because of the fact that the strength of a filament increases as its diameter is reduced, taking into account its cross-sectional area, it is desirable to keep the reinforcing filaments made by the present process relatively small in diameter. In other words, in building a reinforced composite structure, it is better to use more relatively fine filaments as reinforcements, than to use fewer filaments of larger diameter.

Tungsten has been selected as being a particularly satisfactory material for the substrate wire for several reasons, including easy availability. Tungsten wire has especially good crystal orientation wherein the crystals are oriented lengthwise. In view of the fact that the orientation of the material deposited on the wire tends at least initially to follow the orientation of the substrate crystals, the longitudinal orientation of tungsten wire substrate crystals is considered advantageous. Another advantageous feature of tungsten is its chemical adsorption properties which make it a good catalytic agent for the vapors within the deposition chamber.

It is the principal object of this invention to provide a reinforcing filament of high strength and low weight in which the basis substrate contributes only insignificantly to the properties of the filament, and in which the overall physical properties are governed mainly by the properties of the deposited coating. From the point of view of weight, where a tungsten substrate is used its density is 19.3 g./cc. weight, whereas that of the average coating material is only about 3.3 g./cc. Therefore, it would appear to be desirable to remove the substrate altogether, since it has greater density but less strength than the coating material. However, as of the present time no way has been found to eliminate it. The coated portion of the filament is therefore made four or more times greater in diameter than the substrate so that it amounts to more than 93 percent of the cross-sectional area of the finished reinforcement, and the tungsten amounts to a relatively insignificant part of the whole for most purposes.

Another major object of the invention is to provide a way of making light-weight reinforcement filaments which exhibit the superior strength, lightness of weight, and high-temperature properties of certain silicides, carbides, nitrides and borides having low-density and high modulus of elasticity. Examples of suitable coating materials are provided below.

Still another object of this invention is to provide improved apparatus for coating a substrate wire which is rapidly passing through a coating chamber, for instance at a rate up to fifteen feet per minute in the present example. This apparatus includes novel mercury-pool electrodes spaced at intervals along the wire path in the chamber and applying adjustable heating currents to the wires at spaced intervals between which the coating thickness increases.

Other objects and advantages of the present invention will become apparent during the following discussion of the drawings, wherein.

Figure 4:
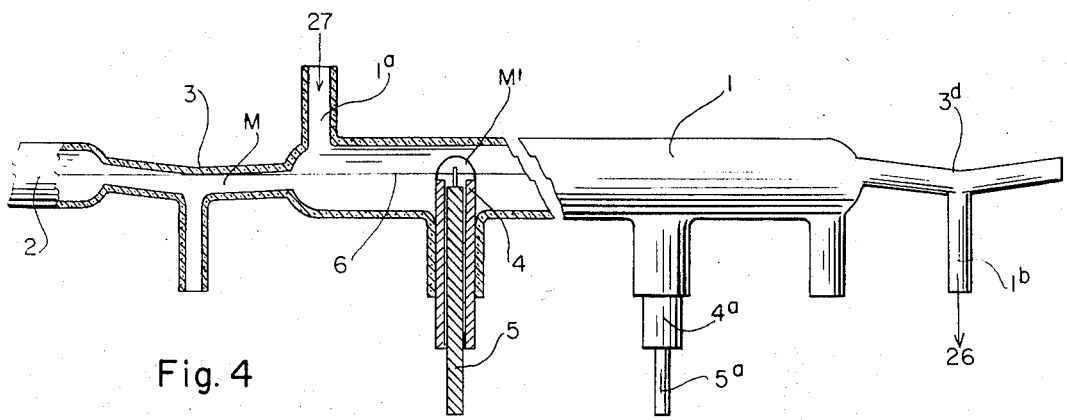
FIG. 4 is an enlarged view partially broken away showing part of a preferred embodiment for a deposition chamber including heating electrodes.
Figure 5:
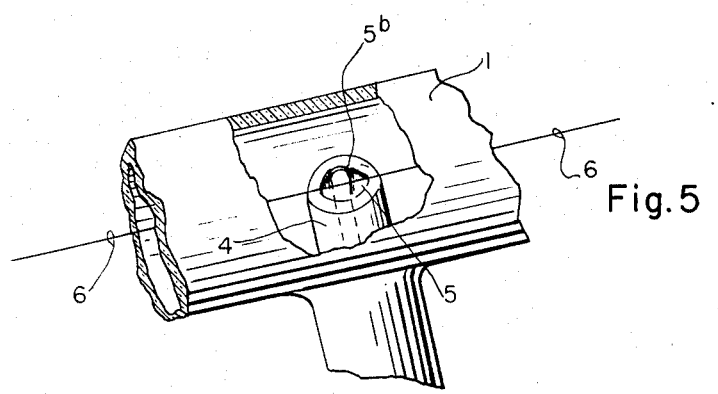
FIG. 5 shows a detailed view of one of the electrodes included in FIG. 4, but viewed from a different angle.
Figure 1:
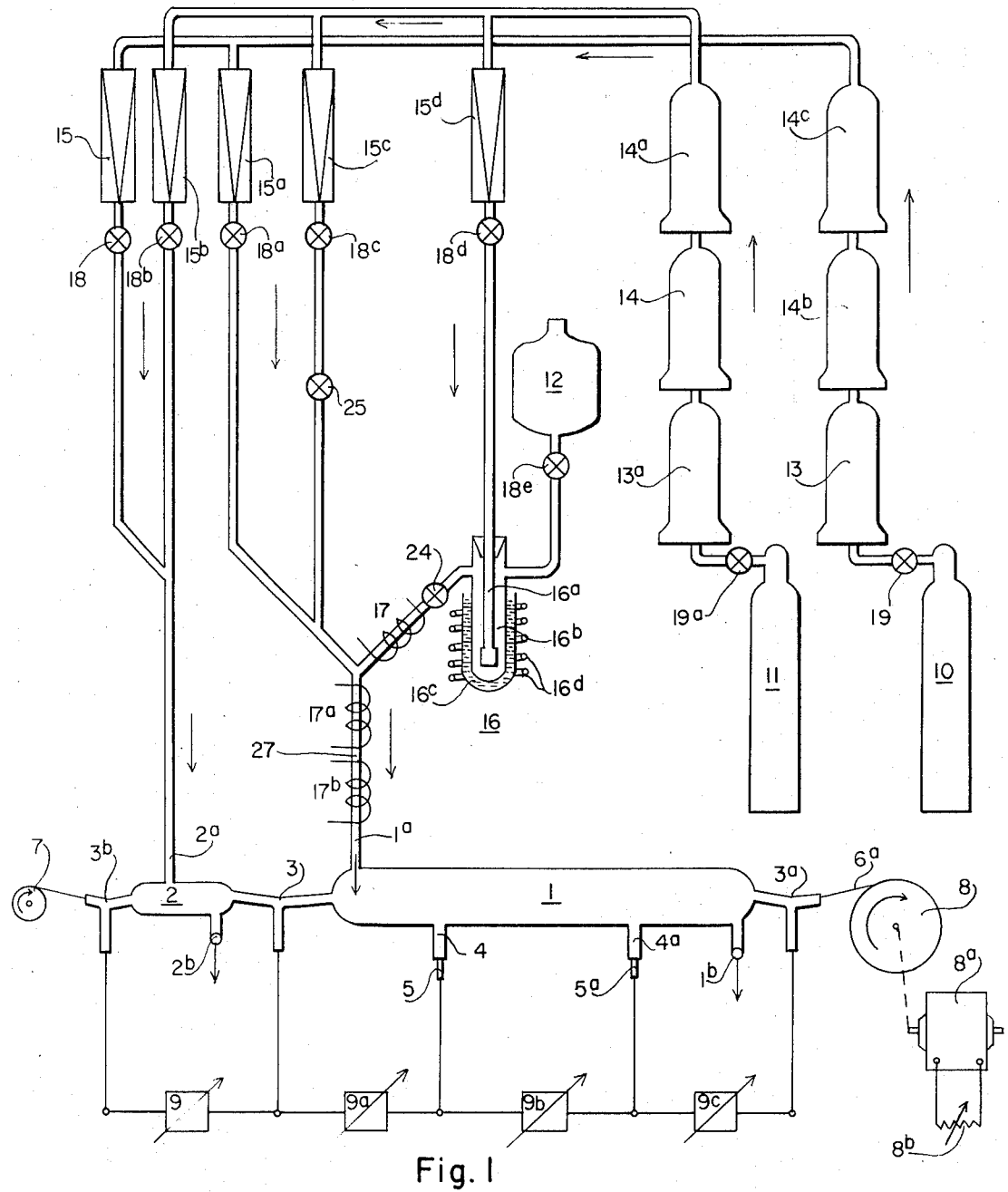
FIG. 1 is a diagram illustrating a process by which reinforcement filaments are made according to the present invention.
Figure 6:
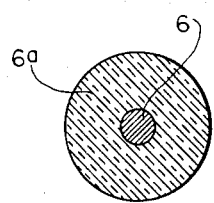
FIG. 6 is an enlarged cross-sectional view through a filament made according to the present teaching.

Referring now to the drawings, FIGS. 1 and 4 illustrate a deposition chamber 1, which is located next to a preheat chamber 2 and has electrode T's 3 and 3a located at opposite ends as can best be seen in FIG. 4. The T's 3 and 3a are filled with mercury M through which a substrate wire 6 passes. The wire 6 also passes and contacts stand pipe electrodes 4 and 4a which have a mercury meniscus M' through which the wire 6–6a passes. Metal rods 5 and 5a extend into the stand pipes 4 and 4a and have guide loops 5b, FIG. 5, at their upper ends to insure that the substrate wire 6 maintains contact with the mercury M' at all times. The left end of the preheat chamber 2 also includes an electrode T 3b, and the T's 3, 3a and 3b as well as the stand pipe electrodes 4 and 4a are connected to power supplies 9, 9a, 9b, and 9c as shown in FIG. 1. These power supplies are preferably adjustable, and drive electric heating currents through the portion of the wire 6–6a which is located between the respective electrodes to which they are connected. The deposition chambers and T's are preferably made of glass or Pyrex, and the chamber 1 includes a gas entrance 1a and exit 1b. The gas entrance to the preheat chamber is labeled 2a and its exit is labeled 2b. The substrate wire 6 is furnished by a supply reel 7, and the finished filament 6a is wound upon a storage reel 8 which can be driven by a motor 8a whose speed is adjustable, for instance by the rheostat 8b. The filament 6a is spaced evenly on the storage reel by a traversing level-wind device (not shown).

The illustrated system supplies two carrier gases to the inlet 1a of the deposition chamber, these gases comprising for example hydrogen from the reservoir 10 and argon from the reservoir 11, these gases passing through cut-off valves 19 and 19a and through palladium purifiers 13 and 13a and conventional drying columns 14, 14a, 14b, and 14c. The hydrogen gas passes through flow meters 15 and 15a and through flow regulating valves 18 and 18a, and thence into the inlets 1a and 2a of the deposition chamber 1 and the preheat chamber 2, respectively.

The hydrogen within the preheat chamber 2 has a reducing and cleaning effect upon the heated tungsten wire (1100–1150° C.) 6 which is about to enter the deposition chamber 1. The component of hydrogen gas passing directly into the inlet 1a to the deposition chamber 1 from the valve 18a likewise serves as a reducing agent in that chamber.

The argon gas from the reservoir 11 passes through flow meters 15b, 15c, and 15d, and its flow is regulated by the valves 18b, 18c, and 18d, respectively. The argon gas passing downwardly through the valve 18b mixes with the hydrogen from the valve 18 and goes into the inlet 2a of the preheat chamber 2, and serves the purposes of displacing air from the chamber 2 and preventing its re-entry thereinto. It is, of course, more economical to save the exhaust gases from the exhaust outlets 2b and 1b by not exhausting them directly into the atmosphere, and this can be done in any suitable way, in a production system.

The argon gas passing through the regulator valve 18c is admitted to the inlet 1a of the deposition chamber 1, and its admission to the chamber is selectively controlled by the valve 25 so that the deposition chamber 1 can be purged by the argon gas when desired.

The argon gas passing downwardly through the flow meter 15d and the regulator valve 18d enters a flask 16b through a gas dispersion tube 16a, and the argon gas then flows through the gas shut-off valve 24 into a gas inlet tube 27 and into the deposition chamber 1. The flask 16b communicates through a flow valve 18e with a reservoir 12 containing a liquid coating compound. The valve 18e is used to maintain the level of the liquid within the flask 16b above the bottom of the gas dispersion tube 16a so that the argon gas from the regulator valve 18d bubbles through the liquid in the flask, thereby entraining vapor of the liquid coating compound in the argon gas which then flows through the shut-off valve 24 and into the deposition chamber 1.

In order to improve the vaporization and entrainment of the liquid from the chamber 12 into the gas from regulator valve 18d, an oil bath 16c is provided around the flask 16b, and is heated by heating coils 16d. Moreover, heating coils 17, 17a and 17b surround the gas inlet tube to maintain a desired elevated temperature of the argon gas and entrained vapor.

Figure 2:
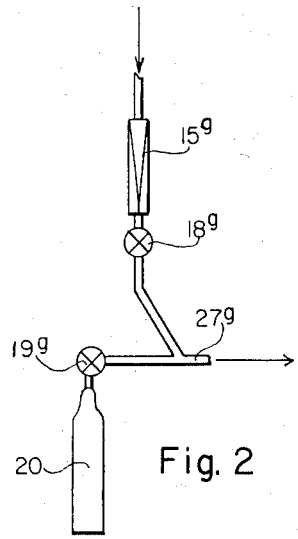
FIG. 2 shows means whereby coating material which is already in a gaseous state can be introduced into a system similar to that shown in FIG. 1.

The coating compound need not be in liquid form, and if it is a gas, it can be furnished from a reservoir 20 as shown in FIG. 2, controlled by a valve 19g and mixed in a duct 27g with argon gas entering through a flow meter 15g and a flow regulator valve 18g. In this event, it would not be necessary to include a bubbling flask assembly as shown at 16 in FIG. 1.

Figure 3:
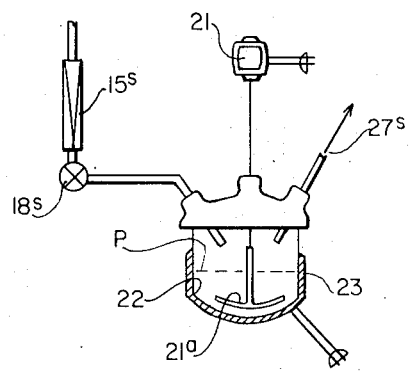
FIG. 3 shows means whereby a coating compound which is normally in solid state can be sublimed, or otherwise vaporized, and entrained in a carrier gas in a system of the type shown in FIG. 1.

FIG. 3 shows a further modification designed for use in the event that the coating compound is a solid, such as a powder P at ambient temperature. In this event, the powder would be contained in a vessel 22 which is maintained at an elevated temperature by a heating mantle 23 for the purpose of providing a vapor above the surface of the powder P which is entrained in argon gas entering the vessel 22 from a flow meter 15s and a regulator valve 18s. The entrained vapor then leaves the vessel through an exit 27s which is disposed to pass through heating coils such as those shown at 17, 17a, and 17b in FIG. 1. An electric motor 21 is provided to drive a stirrer 21a within the vessel 22 in order to increase the gas contact with the heated coating compound therein.

The following specific examples serve to illustrate both the process and resulting products:

SILICON CARBIDE COATING

Silicon carbide filaments have been produced by the present approach both in a batch process of about 18" lengths, and also by passing the filament continuously through the plating chamber and out through mercury-pool seals. The resulting filaments have a coating density ranging from 3.0 to 3.5 g./cc. and a modulus of elasticity ranging from 42.7 to $87.0 \times 10^6$ pounds per square inch. The mechanism by which silicon carbide is deposited is a molecular forming chemical process involving hydrogen reduction of silane compounds. The vapor plating compounds which have been used to deposit the silicon carbide coatings including methyltrichlorosilane, $CH_3Cl_3Si$; ethyltrichlorosilane, $C_2H_5Cl_3Si$; and dichloromethylsilane, $Cl_2CHSiH_3$. A chemical reduction reaction causes the organo-halosilane to break down to silicon and carbon, which combine on the heated substrate surface at temperatures of 1050–1300° C. to form a strongly adherent coating of SiC.

BORON SILICIDE COATING

The boron silicide filaments have also been produced in both eighteen-inch lengths by a batch process and in continuous lengths by continuous-process apparatus. The physical properties of these filaments include: coating densities ranging from 1.8 to 2.3 g./cc., and modulus of elasticity values ranging from 45 to 95×10⁶ pounds per square inch. The process for the fabrication of the boron silicide filaments is also a molecular forming process involving co-deposition of boron and silicon. This reaction involves the hydrogen reduction of a boron halide and a silicon halide or silane compound. The vapor plating compounds which have been used to deposit the boron silicide filaments include (1) silicon tetrachloride, $SiCl_4$, or trichlorosilane, $Cl_3SiH$ as the silicon source; and (2) boron trichloride, $BCl_3$ as the boron source. The reduction reaction causes the plating compounds to break down to silicon and boron, at temperatures of 1050–1300° C. which combine on the substrate to form a strongly adherent coating of boron silicide.

TITANIUM NITRIDE COATING

The process for the fabrication of titanium nitride is a molecular forming process using co-deposition of the titanium and nitrogen. The physical properties of this particular filament material include a modulus of elasticity of 43 to 45×10⁶ p.s.i. and a coating density of 4.8 to 5.3 g./cc. The vapor plating compounds which have been used to deposit the titanium nitride filaments include (1) titanium tetrachloride, $TiCl_4$, as the titanium source; and (2) nitrogen gas as the source of nitrogen. A reduction reaction induced by using hydrogen gas in the process causes the plating compounds to break down at a deposition temperature of 1100 to 1150° C., to form titanium and nascent nitrogen, which combine on the substrate to form a strongly adherent coating of titanium nitride.

TITANIUM BORIDE COATING

The process for the fabrication of titanium boride is a molecular forming process using co-deposition of titanium and boron. The titanium boride filaments have been produced in fourteen-inch lengths by a batch process, and also in continuous lengths by continuous-process apparatus. The physical properties of these filaments include: (1) coating densities ranging from 4.32 to 4.51 g./cc. and (2) modulus of elasticity values ranging from 65 to 75×10⁶ pounds per square inch. The vapor plating chemicals which have been used to deposit the titanium diboride filaments include (1) titanium tetrabromide, $TiBr_4$, or titanium tetrachloride, $TiCl_4$ as the titanium source; and (2) boron trichloride, $BCl_3$ as the boron source. A reduction reaction induced by the presence of hydrogen gas in the process causes the vapor phase plating compounds to break down at deposition temperatures of 1000 to 1300° C. to form titanium and boron, which combine on the substrate to form a strongly adherent coating of titanium boride.

ALUMINUM BORIDE COATING

The fabrication process for aluminum boride filaments is a molecular forming process using vapor phase co-deposition of aluminum and boron. The aluminum boride filaments have been produced in twelve-inch lengths by a batch process operation. The physical properties of these filaments include (1) coating densities ranging from 2.2 to 2.3 g./cc. and (2) modulus of elasticity values ranging from 50 to 60×10⁶ pounds per square inch. The vapor plating chemicals which have been used to deposit the aluminum boride filaments include (1) aluminum trichloride, $AlCl_3$, as the aluminum source; and (2) boron trichloride, $BCl_3$ as the boron source. A reduction reaction induced by the presence of hydrogen gas in the process causes the vapor phase plating chemicals to break down at deposition temperatures of 1050–1200° C. to form aluminum and boron, which combine on the substrate to form a strongly adherent coating of aluminum boride.

SPECIALLY DOPED FILAMENT MATERIALS

The physical properties of the coating materials can often be improved, especially their tensile strength properties, by small additions of doping elements to vapor phase plating compositions. For example, the addition of a small quantity of boron or nitrogen improves the strength properties of silicon carbide coatings.

The present invention is not to be limited to the exact form shown for obviously changes can be made therein within the scope of the following claims.

1. A high-strength low-density filamentous reinforcement material adapted to be incorporated into composite structures as reinforcement, comprising a tungsten core wire having a diameter up to about 0.001 inch, said core wire having a vapor deposited coating thereon of boron silicide, silicon carbide, titanium nitride, titanium boride or aluminum boride, said coated wire having a diameter at least four times the diameter of the core wire alone with the coating constituting at least 93% of the cross-sectional area thereof, the density of the coating being less than about 5 gm./cc. and the modulus of elasticity of the coated wire being at least about 42×10⁶ p.s.i.

2. The filamentous material as set forth in claim 1 wherein the coating thereon is at least .0035 inch in diameter.

3. The filamentous material as set forth in claim 1 wherein the coating is boron silicide.

4. The filamentous material as set forth in claim 1 wherein the coating is silicon carbide.

5. The filamentous material as set forth in claim 1 wherein the coating is titanium nitride.

6. The filamentous material as set forth in claim 1 wherein the coating is titanium boride.

7. The filamentous material as set forth in claim 1 wherein the coating is aluminum boride.

8. The filamentous material of claim 1 wherein the diameter of the composite filament is not greater than about 0.004 in.

References Cited

UNITED STATES PATENTS

| | | | |
|---|---|---|---|
| 1,987,576 | 1/1935 | Moers | 117—106C |
| 2,656,283 | 10/1953 | Fink et al. | 117—107.1X |
| 2,854,353 | 9/1958 | Schope | 117—Boron |
| 2,930,347 | 3/1960 | Bulloff | 117—231X |
| 2,920,006 | 1/1960 | Intemer et al. | 117—Boron |
| 3,177,094 | 4/1965 | Dyksterhuir et al. | 117—231X |
| 3,186,735 | 6/1965 | Laske | 117—231X |
| 3,188,230 | 6/1965 | Bakish et al. | 117—107.1 |
| 3,365,330 | 1/1968 | Hough | 117—106 |
| 3,460,920 | 8/1969 | Long et al. | 29—183.5 |

OTHER REFERENCES

Powell et al., Vapor Plating, 1955, pp. 9, 10, 14, 15, 72–74, 96, 97, 104, 106, 107 and 141 relied upon.

Handbook of Chemistry and Physics, 44th edition, 1962, p. 3454.

ALFRED L. LEAVITT, Primary Examiner

W. E. BALL, Assistant Examiner

U.S. Cl. X.R.

29—183.5, 191.6; 117—128